Jan. 13, 1942.   W. H. STOUT   2,270,089
QUICK COUPLING FOR PIPES
Filed Jan. 4, 1941   2 Sheets-Sheet 1

INVENTOR
William H. Stout
BY T. J. Geisler and
   F. R. Geisler
ATTORNEYS

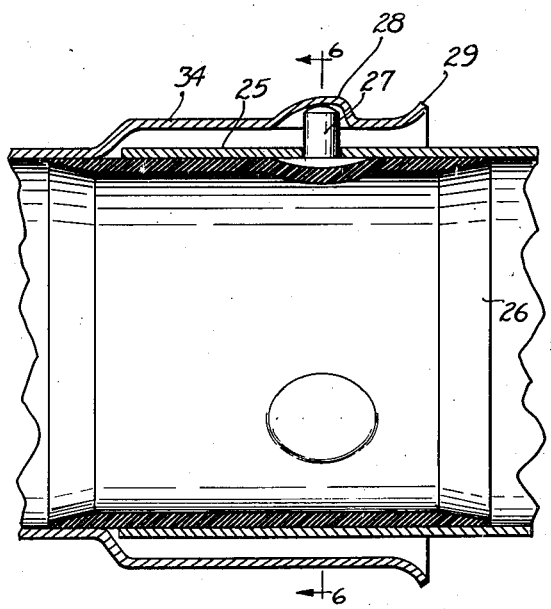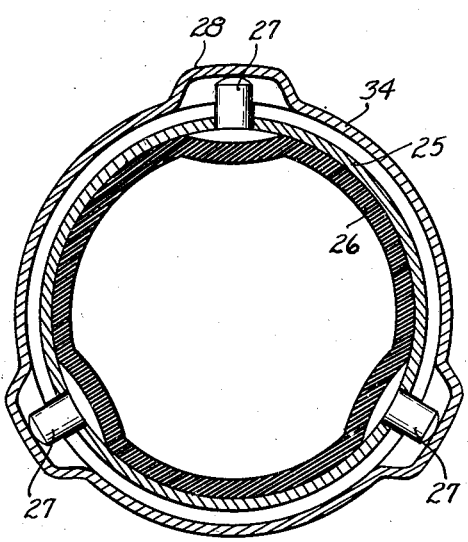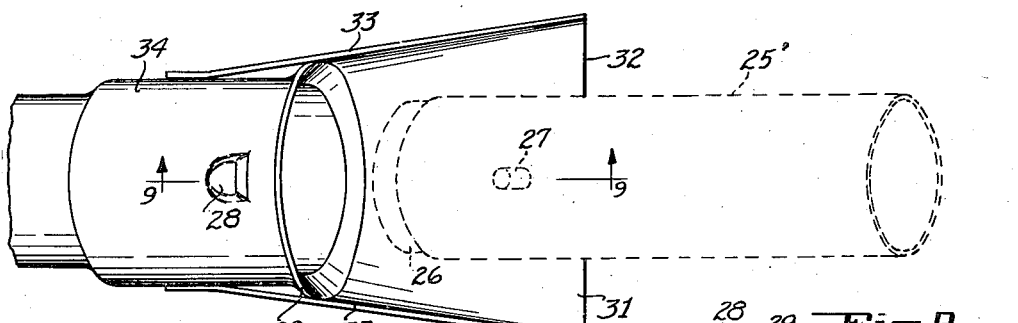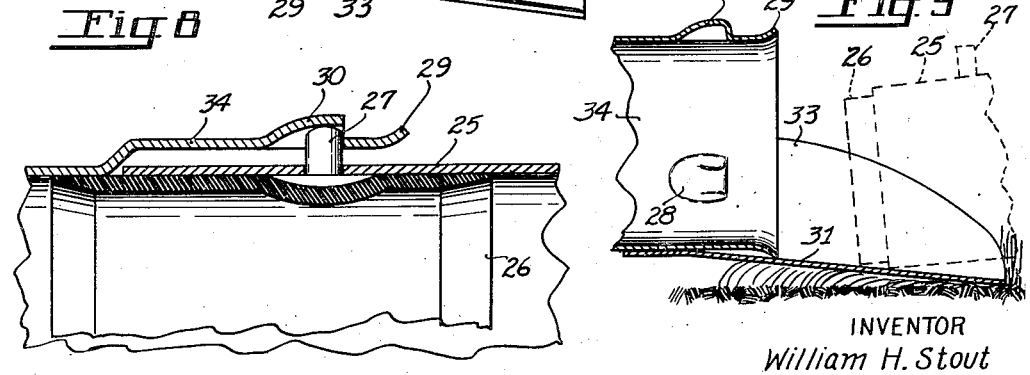

Patented Jan. 13, 1942

2,270,089

UNITED STATES PATENT OFFICE 2,270,089

QUICK COUPLING FOR PIPES

William H. Stout, Eugene, Oreg.

Application January 4, 1941, Serial No. 373,152

5 Claims. (Cl. 285—174)

This application is a continuation in part taken from my copending application, Ser. No. 313,809, filed under date of January 15, 1940, and entitled "Pipe coupler."

This invention relates in general to coupling means for conduits and, in particular, to quick couplers for water pipes and the like, such as the pipes ordinarily used in irrigation systems. Since the pipe-sections in irrigation systems are frequently separated, for example for transportation from place to place, it is necessary to provide coupling means that can be quickly and easily applied.

The principal object of this invention is to provide such a coupler which is readily adaptable for use with standard pipe sections and by means of which the sections may be quickly coupled or uncoupled without the use of tools.

A further object of this invention is to provide a sealing member which will expand against both inner surfaces of a pair of coupled pipe sections, under the pressure exerted by the fluid within the pipe, so as to constitute a pressure seal.

Another object of this invention is to provide a locking means associated with said pressure seal, for holding the coupled pipe sections together.

These and other objects I am able to attain by providing a "bell and spigot" joint with an expansible inner gasket or sealing joint member, and by employing locking pins for the bell and spigot ends in the manner hereinafter briefly described with reference to the accompanying drawings.

In the drawings:

Figure 5 is a sectional elevation showing a slightly-modified form of my invention in which the bell end is made somewhat larger in diameter and is formed with pockets for accommodating the ends of the locking pins;

Figure 6 is a transverse section taken on line 6—6 of Figure 5;

Figure 7 is a view similar to Figure 5, illustrating a slightly differently-formed pocket for the ends of the locking pins in the bell member; and Figures 8 and 9 are a top-plan and a sectional elevation respectively of the end of the bell member of Figures 5 and 7, but showing a supporting base and guide attached to the end of said bell member and constituting a further modification of my invention.

Figure 1:
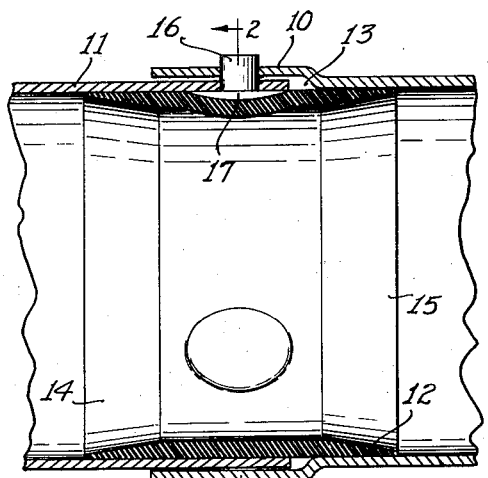
Figure 1 is a longitudinal section of a bell and spigot joint, equipped with sealing member and locking means, embodying my invention.
Figure 2:
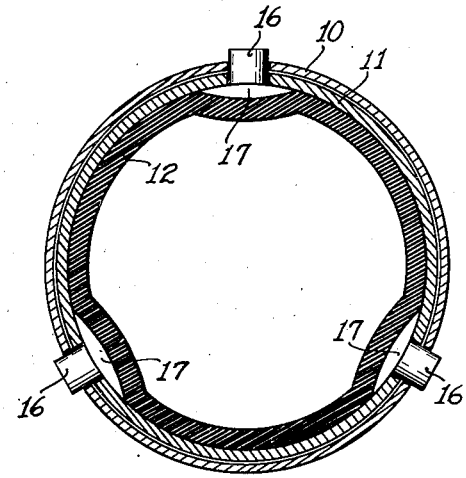
Figure 2 is a transverse section taken on line 2—2 of Figure 1.

Referring first to Figures 1 and 2, the bell end pipe section is indicated by the reference character 10 and the spigot end section by 11, the bell end being of sufficient internal diameter to accommodate the spigot end as shown.

A tubular gasket or sealing member 12, of expansible and resilient material, such as rubber, is disposed in the spigot member 11 and extends beyond the end of the spigot end into the bell member so as to overlap the joint 13 in such manner and to such a degree that internal fluid pressure will cause this gasket member 12 to form a leak-proof pressure seal. The inside surface of the gasket member 12 is preferably beveled at each end, as at 14 and 15, in order to offer less resistance to the passage of the fluid therethrough.

The bell end section 10 and the spigot end section 11 are formed with a plurality of circumferentially-spaced registering holes through which the locking pins 16 project. These pins 16 have enlarged, relatively flat, heads 17 disposed between the gasket member 12 and the adjacent inner-surface of the spigot end 11. These pins hold the bell end and spigot end members in semi-permanent connection, although the pins can, by proper manipulation, be pressed inward against the gasket, 12 to permit the bell end and the spigot end to be separated.

Figure 3:
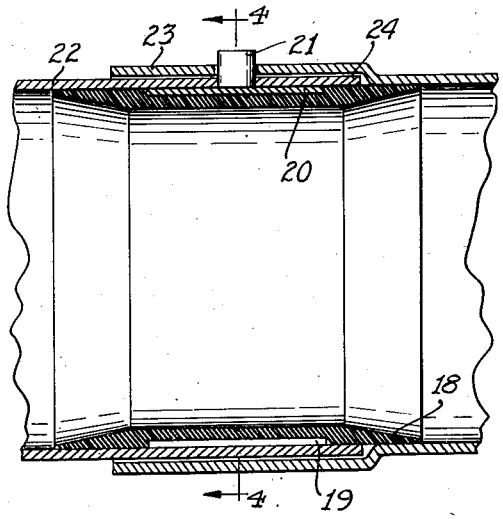
Figure 3 is a longitudinal section of a joint similar to that of Figure 1, in which the locking pins have broader flatter heads, and in which the sealing member is formed with an annular recess on its outer surface to accommodate these heads.
Figure 4:
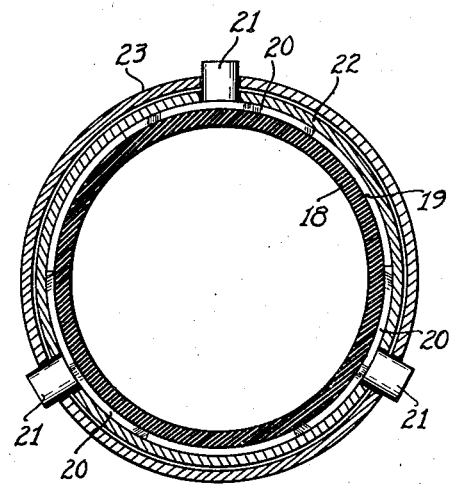
Figure 4 is a transverse section on the line 4—4 of Figure 3.

In Figures 3 and 4 the gasket member 18 is formed with an annular recess 19 extending around its outer surface, and the heads 20 of the locking pins 21 are of approximately the same thickness as the depth of the recess 19 and of the same width as the recess, as shown in Figure 3, and are also curved to conform to the curvature of the outer surface of the gasket and inner surface of the spigot member 22, as shown in Figure 4. In all other respects the coupling shown in Figures 3 and 4 is the same as that of Figures 1 and 2, and the bell end 23 and spigot end 24 are held in semi-permanent connection by the pins 21 which, however, may be pressed inward manually against the gasket member 18 to release the bell end from the spigot, in the manner previously described. The external recess 19 in the gasket member 18 with the cooperating heads 20 of the locking pins prevent any possibility of endwise or axial movement of the gasket member 18 even in the absence of internal pressure exerted against the gasket by the fluid in the pipe.

To facilitate the attaching or detaching of the bell and spigot members I have found it practical to have the bell end member made with an internal diameter considerably greater than the external diameter of the spigot, and to have the extremity of the bell flanged or flared outwardly, and to provide pockets in the bell to accommodate the extremities of the locking pins, as shown in Figures 5 and 6. In the construction illustrated by Figures 5 and 6 the internal diameter of the bell 34 is thus considerably greater than the exterior diameter of the spigot 25. The expansible and flexible tubular gasket 26 seals the junction between the bell and spigot members. A plurality of equally-spaced locking pins 27 extend through holes in the spigot member 25, the heads being disposed between the gasket 26 and the adjacent pipe surface. These pins 27 project into outwardly-deformed pockets 28 in the bell member 34.

The pockets 28 are preferably so formed or rounded that relative rotation between the pigot member 25 and the bell member 24 will cause the pins 27 to be pressed inwardly against the tension of the gasket 26 and to ride outside of the pockets, whereupon the spigot and bell members can be easily pulled apart. In coupling the spigot and joint members the former is inserted into the latter, the flared end 29 of the bell pushing the pins inwardly, and the pins then riding the interior of the bell member until by proper manipulation of the bell and spigot, the pins will snap into the pockets 28 and engage the bottoms of the same in locking relation, as shown in Figure 5. When the pins are in locking position and fluid pressure is exerted against the gasket 26 relative movement between the bell and spigot members is practically prevented, since such relative movement cannot take place to any extent without depressing the pins and the pins cannot be depressed by ordinary force as long as the fluid pressure holds the gasket 26 rigid. Thus the bell and spigot members cannot be disconnected until the fluid pressure is shut off.

As the internal diameter of bell member 24 is considerably greater than the external diameter of the spigot member 25, a certain amount of flexibility is possible therebetween when the internal fluid pressure is shut off, and this facilitates the connecting and disconnecting of the bell and spigot. At least three locking pins should be provided to insure rigidity of the connection when the internal fluid pressure is applied. The gasket 26 of course becomes sealed under the influence of the internal pressure, as previously explained.

The pockets in the bell member 24, for accommodating the external ends of the locking pins 27, may be formed in various ways. For example, in Figure 7, a punched-out pocket 30 is illustrated which, in some cases, may be easier to form than the pocket 28 shown in Figure 5. All that is essential as regards the shaping of the pockets is that, when the internal fluid pressure is shut down, rotation of the bell and spigot members relatively with respect to each other will cause sloping surfaces to engage the locking pins so as to force the pins inward until they ride on the inside surface of the bell member.

As a further means of facilitating the joining of the spigot and bell-end members I have found it desirable, especially when the irrigation pipes are laid on the surface of the ground, to attach an extending base rest 31 (Figures 8 and 9) to the bell member. This base rest 31 is preferably formed with a straight edge 32 and with flaring upwardly-curved side walls 33. This base rest not only supports the end bell member on the ground, as shown in Figure 9, and prevents any inadvertent rotating of the bell member, but it also acts as a guide for the end of the spigot when the latter is to be inserted in the bell and prevents grass or other debris becoming wedged between the end of the spigot and the bell as the spigot is pushed into place. With this guide and support one may grasp the spigot pipe at some distance from the end and easily insert the spigot end into the bell, manipulating the spigot pipe until the locking pins engage the pockets of the bell, whereupon the coupling of the two sections is complete.

Various modifications in the construction of the members of my coupling means might of course be made without departing from the principle of my invention. The forms which I have described illustrate ways in which I have found it practical to make my invention, particularly for use in irrigation pipe lines. It is not my intention to limit my invention however otherwise than as set forth in the attached claims.

I claim:

1. In a pipe coupling including a pair of pipe sections having telescoped adjacent end portions, an internal tubular and expansible gasket having one end extending into one pipe section and the other end extending into the other pipe section, said ends adapted to be held within said pipe sections respectively in snug relation when said gasket is expanded radially under pressure, within said pipe sections, a movable locking element projecting through the inner one of the telescoped end portions and adapted to cooperate with the outer one of the telescoped end portions in locking relation, said gasket being associated with said element and normally urging the latter in a direction toward said outer one of the telescoped end portions and into locking relation therewith.

2. In a pipe coupling including a pair of pipe sections disposed in adjacent end to end and alined relation, a tubular and expansible gasket having its ends disposed within and in snug engagement with the end portions of said pipe sections respectively, a bell formed on the end of one pipe section and overlapping the end portion of the other pipe section, the bell end and the overlapped end portion of the pipe sections formed with registering holes, there being a headed holding pin removably engaged through said holes, the head of the pin being disposed between the gasket and the adjacent inner surface of said other pipe section.

3. A pipe coupler including a pair of pipe sections disposed in adjacent end to end and alined relation, a tubular and expansible gasket having its ends disposed within and in snug engagement with the end portions of said pipe sections respectively, a bell formed on the end of one pipe section and overlapping the end portion of the other pipe section, the overlapped portion of said other pipe section having a radial hole therethrough, a headed pin projecting through said hole, the head being disposed between the gasket and the adjacent inner surface of said other pipe section, and an inwardly opening pocket in the bell to receive the pin, whereby to releasably secure the bell and other pipe section against separation.

4. A pipe coupler including a pair of pipe sections disposed in adjacent end to end and alined relation, a tubular and expansible gasket having its ends disposed within and in snug engagement with the end portions of said pipe sections respectively, a bell formed on the end of one pipe section and overlapping the end portion of the other pipe section, the overlapped portion of said other pipe section having at least three evenly spaced radial holes therethrough, headed pins projecting through the holes, the heads being disposed between the gasket and the inner surface of said other pipe section, and inwardly opening pockets in the bell to receive the pins, whereby to releasably secure the bell and other pipe section against separation.

5. In a pipe coupling, a pair of pipe sections disposed in adjacent end to end and alined relation, a tubular and expansible gasket having its ends disposed within and in snug engagement with the end portions of said pipe sections respectively, a bell formed on the end of one pipe section and overlapping the end portion of the other pipe section, the overlapped portion of said other pipe section having evenly spaced radial holes therethrough, headed pins projecting through the holes, the heads of the pins being disposed between the gasket and the inner surface of said other pipe section, and inwardly opening pockets in the bell to receive the pins, whereby to releasably secure the bell and other pipe section against separation, and a flared guide extending beyond the end of said bell member to facilitate the placing of said other section in said bell.

WILLIAM H. STOUT.